United States Patent [19]
Bittner

[11] 4,009,637
[45] Mar. 1, 1977

[54] MILLING DEVICE

[75] Inventor: Hans-Joachim Bittner, Hagen, Germany

[73] Assignee: H. Putsch & Comp., Germany

[22] Filed: Oct. 7, 1975

[21] Appl. No.: 620,291

[30] Foreign Application Priority Data

Oct. 16, 1974 Germany .......................... 2449316

[52] U.S. Cl. .............................. 90/11 B; 29/104; 51/168
[51] Int. Cl.² ........................................ B23C 3/00
[58] Field of Search ............ 90/11 B, 11 A; 29/104; 51/168, 206 P, 206.4, 206.5

[56] References Cited

UNITED STATES PATENTS

| | | | |
|---|---|---|---|
| 1,042,208 | 10/1912 | Egli | 29/104 |
| 1,561,231 | 11/1925 | Hatz | 51/168 |
| 2,204,945 | 6/1940 | Parker | 90/11 B |
| 2,291,073 | 7/1942 | Dodge | 51/168 X |
| 3,141,268 | 7/1964 | Seidel et al. | 51/168 |
| 3,775,908 | 12/1973 | Meckler et al. | 51/168 X |

FOREIGN PATENTS OR APPLICATIONS

| 206,780 | 12/1959 | Austria | 51/206 P |
|---|---|---|---|
| 398,519 | 9/1933 | United Kingdom | 51/168 |

*Primary Examiner*—Francis S. Husar
*Assistant Examiner*—W. R. Briggs
*Attorney, Agent, or Firm*—Hill, Gross, Simpson, Van Santen, Steadman, Chiara & Simpson

[57] ABSTRACT

The invention relates to a milling device for producing cutting chamfers on knives provided with roof-shaped cutting edges, preferably Koenigsfeld knives, which milling device comprises a milling arbor; a milling tool clamped thereon, the milling tool having cutting edges which are adapted to the cutting chamfers which are to be produced on the roof-shaped cutting edges of the knives; and at least one further milling tool mounted on the milling arbor so as to be non-rotatable relative thereto but movable to a limited extent in the axial direction of the milling tool; and wherein protrusions and recesses are formed in the mutually facing sides of the two milling tools at least in the region of their cutting edges, and the protrusions on one milling tool extend into the recesses in the other milling tool for the purpose of producing alternating overlapping of the cutting edges of the milling tools.

16 Claims, 11 Drawing Figures

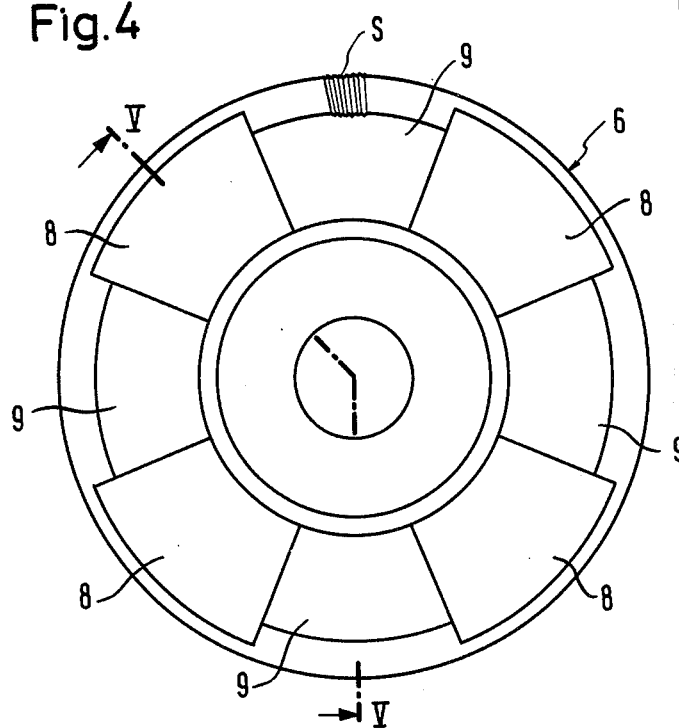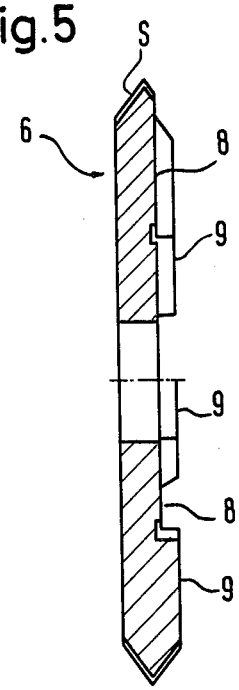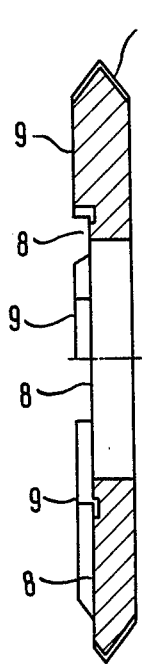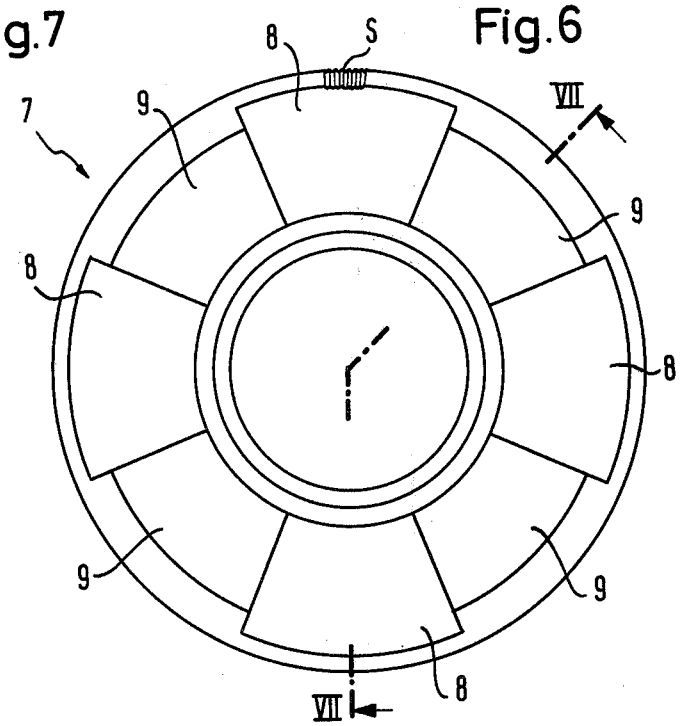

MILLING DEVICE

The present invention relates to a milling device.

A known milling device for producing cutting chamfers on knives provided with roof-shaped cutting edges, preferably Koenigsfeld knives, comprises a milling arbor on which is clamped a milling tool whose cutting edges are adapted to the cutting chamfers which are to be produced on the roof-shaped cutting edges of the knives.

Side-milling cutters having a roof-shaped or wedge-shaped double cutting edge in the region of the periphery of the milling tool are used to produce the cutting chamfers on knives of this type, for example Koenigsfeld beet-slicing knives. The cutting chamfers are produced in two working steps, a long chamfer being first produced by means of a so-called rough milling tool, and then a short chamfer, the actual cutting chamfer, being produced by a so-called filing (and) milling tool. These two working steps are effected individually by means of an automatic milling machine for each roof-shaped cutting edge (each in the form of two legs) of a knife of this type. Thus, a relatively long period of time is required for producing the cutting chamfers.

Experiments have shown that, owing to the errors of pitch of the knives conditioned by manufacture, it is impossible to arrange two or more side-milling cutters in a row in order to simultaneously machine several of the roof-shaped cutting edges of the knives and thus to reduce the relatively long period of time required for producing the cutting chamfers. Such pitch errors are caused by, for example, distortion of the roof-shaped cutting chamfers during the hardening operation. They are also caused by the preparation required before re-sharpening blunt knives. Before they are re-sharpened, blunt knives have to be trued and trimmed, i.e. milled or ground by the amount of the width of the wear marks in the region of the cutting edges.

In the case of Koenigsfeld knives for example, the thickness of the roof legs is only 0.8 to 0.9 mm. This thickness of the legs is tapered to 0.35 to 0.4 mm by the rough-milling operation. Thus, during the rough-milling operation, even a relatively small pitch error necessarily results in differing thicknesses of the legs of the roof of the knife and thus to differing resistances of the cutting edges of the knives to breakage and deformation. The non-uniform thickness of the legs also takes effect when producing the short chamfer by means of the so-called filing and milling tool. Owing to the non-uniform thickness of the legs, the filing and milling tool has to be set such that it also produces an effective cutting chamfer on the leg having the greatest thickness. This means that the cutting chamfers of the thicker leg and the thinner leg differ in width and, moreover, the thinner leg is milled through, thus producing a burr in the region of the cutting edge of the cutting chamfer, which burr folds over, so that an effective cutting edge is not provided. However, since this impairs the quality of the slices of beet, this burr has to be removed by additional hand finishing.

The removal of the swarf during the milling operation constitutes a further difficulty in the case of milling tools arranged in a row. Thus, as a result of arranging milling tools in a row, a V-shaped notch is formed between two milling tools at their lowest point, so that it is impossible to remove the swarf laterally. Thus, the cutting edges of the milling tools are clogged with swarf after a short period of time, thus preventing the sharpening of the cutting edges of the knives in the region of the edges of the roof and leading to the rounding of the edge of the roof.

The object of the present invention is to provide a milling device in which, irrespective of any possible pitch errors, it is possible to economically produce the cutting chamfers of the knives in a simple manner and with low technical expense.

In accordance with the present invention there is provided a milling device for producing cutting chamfers on knives provided with roof-shaped cutting edges, preferably Koenigsfeld knives, which milling device comprises a milling arbor; a milling tool clamped thereon, the milling tool having cutting edges which are adapted to the cutting chamfers which are to be produced on the roof-shaped cutting edges of the knives; and at least one further milling tool mounted on the milling arbor so as to be non-rotatable relative thereto but movable to a limited extent in the axial direction of the milling tool; and wherein protrusions and recesses are formed in the mutually facing sides of the two milling tools at least in the region of their cutting edges, and the protrusions on one milling tool extend into the recesses in the other milling tool for the purpose of producing alternating overlapping of the cutting edges of the milling tools.

The present invention provides a milling device by means of which two or more roof-shaped cutting edges, i.e. a total of four or more cutting chamfers, can be produced simultaneously. Pitch errors cannot result in non-uniform processing of the legs of the roof-shaped cutting edges, since, in a known manner, the clamped milling tool is aligned with the associated roof-shaped cutting edge by means of a centering dog, and, owing to their freedom of movement in the axial direction of the milling tool, the additional milling tool or milling tools, mounted on the milling arbor adjacent to the clamped milling tool, are automatically centered with the roof to be milled during the milling operation. Tests have shown that vibration phenomena or chatter marks do not occur.

In a preferred embodiment, only one further milling tool is arranged for limited movement in the axial direction of the milling tool in addition to the clamped milling tool. An arrangement of this type is of simple technical construction and is not susceptible to trouble.

However, it is also possible to arrange, at any time, a plurality of movable milling tools at one side of the fixed milling tool. Furthermore, it is possible to arrange at least one further movable milling tool at each side of the clamped milling tool.

It is advantageous to clamp each further movable milling tool on a sliding sleeve and to mount the sliding sleeve on a clamping sleeve so as to be axially displaceable within a restricted range corresponding to the maximum possible pitch error of the knives. The sliding sleeve may be keyed to the clamping sleeve by means of a tongue-and-groove arrangement so as to be non-rotatable relative to the clamping sleeve. An arrange of this type is of simple technical construction and is therefore completely unsusceptible to trouble. By simply changing the sliding sleeve, the milling device can be adapted to the particular knife pitch to be machined.

The cutting edges of the milling tool overlap one another alternately owing to the fact that the sides of the milling tool are constructed with protrusions and ecesses. Thus, the cutting edges of the milling tool extend beyond the roof edges of the roof-shaped cutting edges of the knives, so that it is also possible for the warf to flow laterally in this region during the milling operation. Thus, the cutting edges of the milling tool annot become clogged. Furthermore, by virtue of this onstruction, it is possible to arrange the milling tools t a distance from one another when in the milling osition. Thus, a gap is provided between the milling ools and further improves the flow of swarf.

In a preferred embodiment, the recesses in the sides f the milling tools are of segmental or wedge-shaped onfiguration when viewed transversely of the axis of 1e milling tool. Thus, segmental or wedge-shaped pro-usions are necessarily formed between the recesses nd, upon assembling the milling device, extend into 1e opposite recesses in the adjacent milling tool. In 1is embodiment, the depth of the recesses corresponds ) approximately one third of the width of the milling ol, each milling tool having four recesses of this type.

In the above-mentioned preferred embodiment of the illing device which is constructed in accordance with 1e invention and which has only one movable milling ool in addition to the clamped milling tool, the clamp-1g sleeve is arranged between a clamping nut at the 'ee end of the milling arbor and the clamped milling ool. The side of the clamped milling tool remote from 1e clamping sleeve abuts against a flange on the mill-1g arbor by way of a spacer in the form of a washer. In 1is embodiment, the end of the sliding sleeve facing 1e clamped milling tool also has a flange and its other nd is provided with an external screw-thread on which arranged a clamping nut which presses the further lovable milling tool against the flange on the sliding eeve. In this embodiment, the movable tool and the amped milling tool have a recess for receiving the ange of the sliding sleeve.

In this embodiment, the sliding sleeve is movable ack and forth within a restricted range corresponding > the maximum possible pitch error of the knives. The amped milling tool acts directly as a stop when the iding sleeve is in one end position, and a flange on the amping sleeve acts as a stop when the sliding sleeve is its other end position.

The construction of the described embodiment is chnically uncomplicated and is thus very inexpensive. he individual parts can be assembled in a simple man-r and without the use of special devices. The arrangement is substantially maintenance-free and is not susptible to external influences.

The present invention is further described hereinafr, by way of example, with reference to the accompa-ing drawings, in which:

FIG. 4 is a front elevation of a clamped milling tool of e milling device shown in FIG. 3;

FIG. 5 is a section taken in the plane V—V of FIG. 4;

FIG. 6 is a front elevation of a movable milling tool of e milling device illustrated in FIG. 3;

FIG. 7 is a section in the plane VII—VII of FIG. 6;

Figure 8:
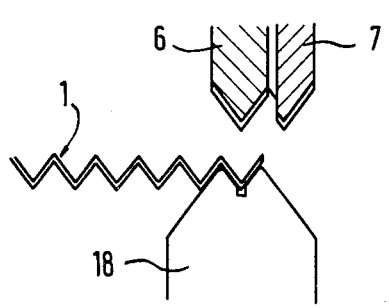
Figure 10:
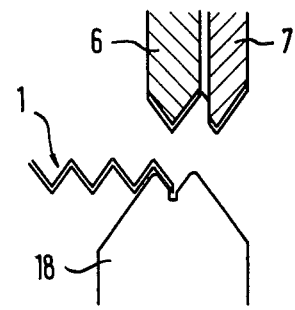
Figure 9:
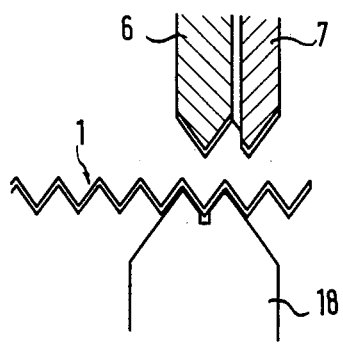
Figure 11:
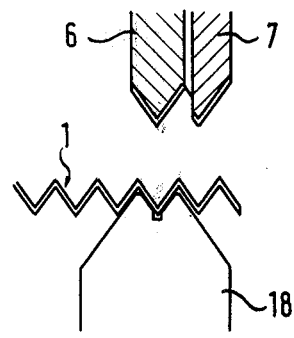

FIGS. 8 and 9 each show the centering operation for the first and the second milling operation respectively for sharpening a so-called B knife; and FIGS. 10 and 11 show the centering operation for the first and the second milling operation respectively for sharpening a so-called A knife.

Figure 1:
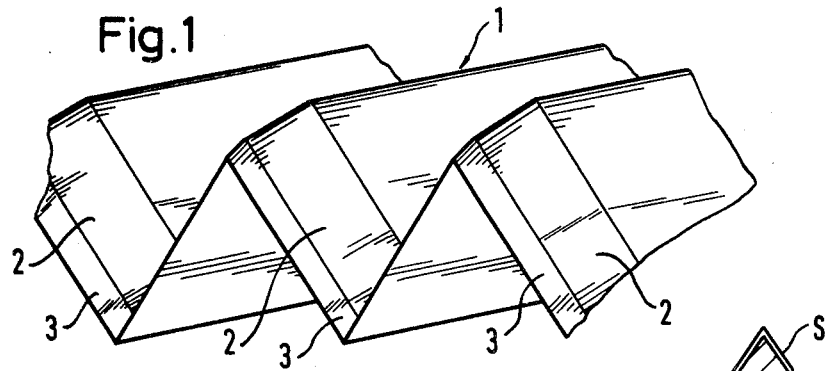
FIG. 1 is an enlarged, perspective illustration, par-lly broken away, of cutting chamfers produced on a ife provided with roof-shaped cutting edges.

As will be seen from FIG. 1, knives of the type under consideration, such as Koenigsfeld knives for slicing beet, comprise legs which are arranged in a row in a roof-shaped manner and which are provided with cutting chamfers 2 and 3 in the region of their front edges for the purpose of forming roof-shaped cutting edges. These cutting chamfers are produced in two working operations. A so-called rough milling tool produces the long chamfer 2 which tapers the thickness of the legs of from 0.8 to 0.9 mm to a thickness of from 0.35 to 0.4 mm during a so-called rough milling operation. The short chamfer, the actual cutting chamfer 3, is then produced by means of a so-called filing and milling tool.

Figure 2:
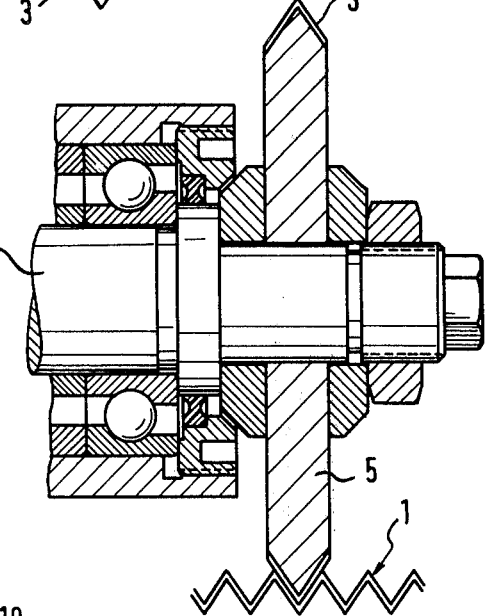
FIG. 2 shows a known milling device for producing e cutting chamfers.

The long chamfer 2 and the so-called cutting chamfer 3 were hitherto produced by milling devices of the type illustrated in FIG. 2. In known milling devices of this type, a side-milling cutter 5 is secured on a milling arbor 4 and its V-shaped double cutting edges S produce two long chamfers 2 and then two short cutting chamfers 3 on the knives 1.

Figure 3:
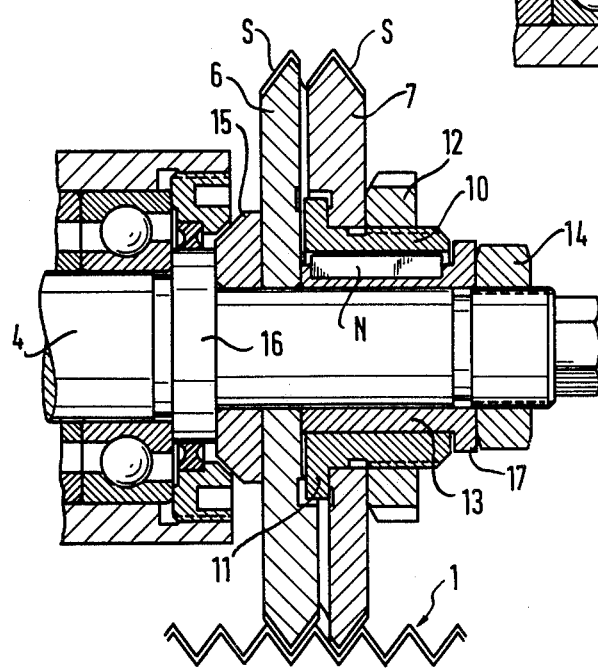
FIG. 3 shows an embodiment of a milling device in cordance with the invention for producing the cut-1g chamfers.

On the other hand, four long chamfers 2 and then four short cutting chamfers 3 can be produced in one working operation by means of a milling device which is constructed in accordance with the invention and which is illustrated in FIG. 3.

Like the known milling device, the milling device in accordance with the invention has a fixedly clamped milling tool 6, although it has a further, movably mounted milling tool 7. As may be seen from FIGS. 4 to 7, the clamped milling tool 6 and the movable milling tool 7 have, in the region of their mutually facing end faces, a total of four segmental or wedge-shaped recesses 8 which are angularly spaced by 90° relative to one another and whose widths are such that protrusions 9 are formed between the recesses. The two milling tools are identical with the exception of their bores which have different diameters. In the same manner as the known milling tool 5, the fixed milling tool and the freely movable further milling tool 7 have, in the region of their peripheries, fine double cutting edges S arranged one behind the other around the entire periphery. For the sake of clarity, FIGS. 4 and 6 show only a few of the double cutting edges S around the periphery of the milling tools.

As may be seen from FIG. 3, the further milling tool 7, mounted so as to be freely movable adjacent to the clamped milling tool 6, is arranged on a sliding sleeve 10 whose end facing the fixed milling tool carries a flange 11 against which the clamping tool 7 is pressed by means of a clamping nut 12 which engages an external screw-thread on the sliding sleeve 10.

The sliding sleeve 10 is mounted on a clamping sleeve 13 by means of a tongue-and-groove arrangement N so as to be non-rotatable relative to the clamping sleeve but displaceable thereon in the axial direction of the milling tool, the clamping sleeve 13 being slipped onto the milling arbor 4. The clamping sleeve 13 is pressed against the milling tool 6 by means of a clamping nut 14 arranged on an external screw-thread at the free end of the milling arbor 4, and the milling tool 6 in turn abuts against a collar 16 on the milling arbor 4 by way of a spacer 15 in the form of a washer.

The end of the clamping sleeve 13 facing the clamping nut 14 has a flange 17 whose end face presented to the milling tools is arranged at such a distance from the end face of the clamping sleeve 13 which abuts against the milling tool 6 that the sliding sleeve 10 can move back and forth in the axial direction of the milling tool within a restricted range corresponding to the maximum possible pitch error of the knives.

The cutting edges S of the milling tools alternately overlap owing to the recesses 8 into which the protrusions 9 on the adjacent milling tool extend. Thus, during the milling operation, it is possible for swarf to flow between the two milling tools which, for this purpose, and as may be seen from FIG. 3, are arranged at a short distance from one another as a result of appropriate dimensioning of the clamping sleeve 13 and the sliding sleeve 10.

In practice, cutting chamfers have to be produced in knives 1 which begin or terminate with half a roof (so-called A knives shown in FIGS. 10 and 11), and on knives which begin or terminate with a whole roof (so-called B knives illustrated in FIGS. 8 and 9). The production of cutting chamfers on B knives is illustrated diagrammatically in FIGS. 8 and 9, and the production of cutting chamfers on A knives is illustrated diagrammatically in FIGS. 10 and 11.

Thus, each fixed milling tool 6 of the device has an associated centering dog 18 whose end facing the milling tool 6 has a notch for receiving half a roof (in the case of A knives) or a whole roof (in the case of B knives) of the knife 1. Thus, as may be seen from FIG. 8, a complete roof is provided with one cutting chamfer per leg by means of the clamped milling tool 6 during the first pass in the case of B knives. Referring to FIG. 9, the next roof but one is centered by the centering dog 18 during the second pass, so that, during the subsequent milling operation, the movable milling tool 7 produces the cutting chamfers following the first cutting chamfers produced, and the fixed milling tool 6 produces the following cutting chamfers.

In the case of B knives, the clamped milling tool 6 produces only one cutting chamfer on the knife 1 in the first instance, as may be seen from FIG. 10. Referring to FIG. 11, four cutting chamfers are produced during the following working operation. As mentioned above, the clamped milling tool 6 is accurately aligned with the legs of the roof-shaped cutting edges by means of the associated centering dog 18. On the other hand, in accordance with the invention, the adjacent free milling tool 7 automatically seeks its correct position during the milling operation, so that pitch errors of the knives 1 do not have any effect upon the milling operation.

Taking into account the increased number of loading and unloading operations, an increase in performance of more than 70 percent is obtained with conventional milling machines by using the illustrated embodiment of the milling device in accordance with the invention.

I claim:

1. Milling device for producing cutting chamfers on knives provided with roof-shaped cutting edges, which milling device comprises a milling arbor; a milling tool clamped to rotate circularly about a central axis of the milling arbor, the milling tool having roof-shaped cutting edges which cut chamfers which are to be produced on the roof-shaped cutting edges of the knives; and at least one further milling tool also having roof-shaped cutting edges, said tool being mounted on the milling arbor with a mounting means for circular rotation about said central axis and for non-rotatable motion relative to the milling arbor but freely movable during cutting along the axis of the milling arbor between limit means on said arbor to self-seek correct axial alignment for an adjacent cutting edge on the knife; and wherein protrusions and recesses are formed in the mutually facing sides of the two milling tools at least in the region of their cutting edges, and the protrusions on one milling tool extend into the recesses in the other milling tool to produce alternating overlapping of the cutting edges of the milling tools to simultaneously cut adjacent and closely spaced roof-shaped cutting edges of the knives.

2. Milling device as claimed in claim 1, wherein only one further milling tool is arranged adjacent to the clamped milling tool.

3. Milling device as claimed in claim 1, wherein the further milling tool is clamped on a sliding sleeve.

4. Milling device as claimed in claim 3, wherein the sliding sleeve is mounted on a clamping sleeve so as to be axially displaceable within a restricted range corresponding to the maximum possible pitch error of the knives.

5. Milling device as claimed in claim 4, further comprising a tongue-and-groove arrangement which keys the sliding sleeve to the clamping sleeve so as to be non-rotatable relative to the clamping sleeve.

6. Milling device as claimed in claim 4, further comprising a clamping nut which clamps the clamping sleeve between the free end of the milling arbor and the clamped milling tool.

7. Milling device as claimed in claim 6, wherein the side of the clamped milling tool which is remote from the clamping sleeve is retained by a collar of the milling arbor.

8. Milling device as claimed in claim 7, wherein the end of the sliding sleeve which faces the clamped milling tool is provided with a flange and its other end is provided with an external screw-thread, and a clamping nut is screwed in said external screw-thread and presses the further milling tool against the flange.

9. Milling device as claimed in claim 8, further comprising a recess for receiving the flange located in the side of the further milling tool which faces the clamped milling tool.

10. Milling device as claimed in claim 8, wherein a recess for receiving the flange of the sliding sleeve is located in the side of the clamped milling tool which faces the further milling tool.

11. Milling device as claimed in claim 6 wherein the sliding sleeve abuts against the clamped milling tool when in one stop position and against a flange of the clamping sleeve when in its other stop position.

12. Milling device as claimed in claim 1, wherein the protrusions and recesses of the milling tools are of segmental or wedge-like construction transversely of the axis of the milling tools.

13. Milling device as claimed in claim 12, wherein a projection of the lateral boundary faces of the protrusions and recesses of the milling tool intersects the axis of the milling tool.

14. Milling device as claimed in claim 12 wherein the depth of the recesses measured in the direction of the axis of the milling tool, is equal to approximately one third of the width of the milling tool.

15. Milling device as claimed in claim 12 wherein each milling tool has four protrusions and four recesses.

16. Milling device as claimed in claim 1 wherein the milling tools are spaced apart when in the milling position.

* * * * *